Patented Apr. 11, 1950

2,503,731

UNITED STATES PATENT OFFICE 2,503,731

1,4-DI(META-PENTADECYL-PHENOXY)-BUTANE

Mortimer T. Harvey, South Orange, N. J., assignor to The Harvel Corporation, a corporation of New Jersey No Drawing. Application December 31, 1947, Serial No. 795,127

1 Claim. (Cl. 260—613)

This invention relates to novel compositions and to methods for preparing them. In its more specific aspect the invention is directed to a high melting point wax derived from well known hydrogenated cardanol.

Hydrogenated cardanol consists essentially of a compound having the following formula:

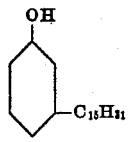

According to this invention hydrogenated cardanol, which has a melting point of approximately 126° F. may be reacted with 1,4-dichlor butane to provide a synthetic wax of high melting point of approximately 190° F. and having the following formula:

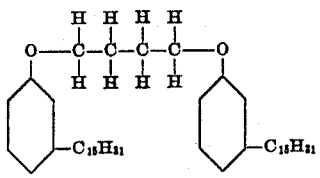

This novel wax may be used in those places where high melting point waxes are required. They are compatible with other waxes, such as beeswax, petroleum waxes, carnauba wax, etc. and may be combined therewith to raise its melting point.

The following is a general method which may be followed for the production of my novel compound.

Two moles of hydrogenated cardanol are mixed with a solution consisting of 2.5 moles of sodium hydroxide in 96 parts of water. This mixture is heated and agitated until a uniform distribution of the mix is obtained and thereto is added 1 mole of 1,4-dichlor butane. The mixture is heated to boiling under a reflux condenser and maintained in this state for about 10 hours. Instead of heating under a reflux condenser, the heating may be carried out in a sealed autoclave and heat is applied to raise pressure to 100 lbs. per square inch and maintained in this condition for 2 to 3 hours.

Then the reaction mass, by whatever method it is carried out, is neutralized, water washed and dehydrated. The washed dehydrated mass is dissolved in and then recrystallized out of petroleum solvents. The resultant recrystallized product is a snow white waxy solid whose melting point is 190° F.

Having thus described my invention, what I claim is:

A novel compound

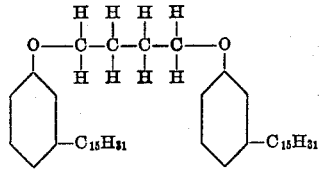

said compound being a waxy solid whose melting point is approximately 190° F.

MORTIMER T. HARVEY.

REFERENCES CITED

The following references are of record in the file of this patent:

UNITED STATES PATENTS

| Number | Name | Date |
|---|---|---|
| 2,171,498 | Bruson | Aug. 29, 1939 |